US010454159B2

(12) United States Patent
Jeon et al.

(10) Patent No.: US 10,454,159 B2
(45) Date of Patent: Oct. 22, 2019

(54) ANTENNA SYSTEM USING A MOTION SENSOR AND METHOD FOR OPERATING THE ANTENNA SYSTEM USING A MOTION SENSOR

(71) Applicants: HYUNDAI MOTOR COMPANY, Seoul (KR); LG INNOTEK CO., LTD., Seoul (KR)

(72) Inventors: Seul Ki Jeon, Suwon-si (KR); Hyun Sang Kim, Hwaseong-si (KR); Nam Woong Hur, Hwaseong-si (KR); Jin Ho Gwon, Osan-si (KR)

(73) Assignees: HYUNDAI MOTOR COMPANY, Seoul (KR); LG INNOTEK CO., LTD., Seoul (KR)

( * ) Notice: Subject to any disclaimer, the term of this patent is extended or adjusted under 35 U.S.C. 154(b) by 18 days.

(21) Appl. No.: 15/359,979

(22) Filed: Nov. 23, 2016

(65) Prior Publication Data
US 2017/0366281 A1 Dec. 21, 2017

(30) Foreign Application Priority Data
Jun. 21, 2016 (KR) .................. 10-2016-0077588

(51) Int. Cl.
*H01Q 1/32* (2006.01)
*H04B 17/27* (2015.01)
*H04B 17/318* (2015.01)
*G07C 9/00* (2006.01)
*H01Q 1/27* (2006.01)

(52) U.S. Cl.
CPC ........... *H01Q 1/3241* (2013.01); *H04B 17/27* (2015.01); *H04B 17/318* (2015.01); *G07C 9/00309* (2013.01); *G07C 2209/63* (2013.01); *H01Q 1/273* (2013.01)

(58) Field of Classification Search
CPC ........................ H01Q 1/3241; G01C 22/006
See application file for complete search history.

(56) References Cited

U.S. PATENT DOCUMENTS 8,032,324 B1 * 10/2011 Bryant ................. G01C 25/005
702/141
2009/0256715 A1 * 10/2009 Frederick ........... G08B 21/0213
340/686.6

(Continued)

FOREIGN PATENT DOCUMENTS

JP 2011-127368 A 6/2011
JP 2011-147104 A 7/2011

(Continued)

OTHER PUBLICATIONS

Office Action issued in corresponding Korean Patent Application No. 10-2016-0077588, dated Jul. 1, 2017.

*Primary Examiner* — Ricardo I Magallanes
(74) *Attorney, Agent, or Firm* — Morgan, Lewis & Bockius LLP

(57) ABSTRACT

An antenna system using a motion sensor includes an antenna having a plurality of axes within a smart device, whereby motion sensor sensing axis information is generated by movement or rotation of the plurality of axes of the antenna, and a controller for controlling the information sensed by the motion sensor and a strength of a signal of the antenna having the plurality of axes received in real time.

3 Claims, 3 Drawing Sheets

(56) References Cited

U.S. PATENT DOCUMENTS

| | | | |
|---|---|---|---|
| 2012/0286926 A1* | 11/2012 | Higemoto | B60R 25/24 |
| | | | 340/5.61 |
| 2012/0330594 A1* | 12/2012 | Lee | G01S 5/16 |
| | | | 702/94 |
| 2015/0333405 A1 | 11/2015 | Sato | |
| 2017/0282858 A1* | 10/2017 | Sass | B60R 25/24 |

FOREIGN PATENT DOCUMENTS

| | | |
|---|---|---|
| JP | 5468239 B2 | 4/2014 |
| JP | 2014-092921 A | 5/2014 |
| JP | 2015-233271 A | 12/2015 |
| KR | 10-2009-0062174 A | 6/2009 |
| KR | 10-2010-0079607 A | 7/2010 |

* cited by examiner

ANTENNA SYSTEM USING A MOTION
SENSOR AND METHOD FOR OPERATING
THE ANTENNA SYSTEM USING A MOTION
SENSOR

CROSS-REFERENCE TO RELATED
APPLICATION

This application claims the benefit of priority to Korean Patent Application No. 10-2016-0077588, filed on Jun. 21, 2016 with the Korean Intellectual Property Office, the disclosure of which is incorporated herein in its entirety by reference.

TECHNICAL FIELD

The present disclosure relates to an antenna system using a motion sensor and a method for operating the antenna system using a motion sensor, and more particularly, to a technology of implementing the same function as a smart device including a plurality of antennae by using a motion sensor together with a first-axis antenna or a second-axis antenna.

BACKGROUND

In accordance with the spread of owner-driven cars due to improvement of a quality of life, the owner-driven car has now become a daily necessity. Therefore, research into an anti-theft apparatus of the own-driven car and various technologies of opening a door of the vehicle and starting the vehicle has been continuously conducted. An example of this research includes a keyless entry scheme and a keyless start scheme.

The keyless entry scheme indicates a scheme of opening or closing the door without performing a separate manipulation of a key or a remote controller by a driver. In the keyless entry scheme, when the driver possesses the key on his/her body, the key and an electronic authentication apparatus in the vehicle transmit and receive data to and from each other, and a locking module of the door is automatically operated when authentication is made.

A smart key is used in this system, authentication information on a vehicle and a radio frequency (RF) signal transmitting and receiving apparatus are provided in the smart key, and the vehicle includes several antennae provided at an inner side and an outer side thereof to communicate with the smart key.

In order to implement a smart key system, at most ten antennae having low frequency (125 kHz or 134 kHz) field characteristics are used.

The antennae of the smart key system are used to sense the smart key outside the vehicle.

This electric wave belongs to a low frequency region, and since an electric wave generation region is within about 1 m from the vehicle, the antennae may sense the smart key and communicate with the smart key in only this region.

Even though the antennae used in the smart key system have the same hardware configuration, the number of antennae that are installed is plural, such that a coat required for manufacturing the antennae is unnecessary.

SUMMARY

The present disclosure has been made to solve the above-mentioned problems occurring in the prior art while advantages achieved by the prior art are maintained intact.

An aspect of the present disclosure provides an antenna system using a motion sensor capable of decreasing a waste of space of a smart device such as a smart key and replacing expensive antennae by a cheaper motion sensor to decrease a cost required for manufacturing the smart device by implementing the same functionality as the smart device including all of a first-axis antenna to a third-axis antenna using the motion sensor including an acceleration sensor, a gyro sensor, a geomagnetic sensor, or the like, together with the first-axis antenna or the second-axis antenna, and a method for operating the same.

Other objects and advantages of the present disclosure may be understood by the following description and will be more clearly appreciated by exemplary embodiments of the present disclosure. It may be easily appreciated that objects and advantages of the present disclosure may be realized by means mentioned in the claims and a combination thereof.

According to an exemplary embodiment of the present disclosure, an antenna system using a motion sensor includes: an antenna having a plurality of axes within a smart device, whereby motion sensor sensing axis information is generated by a movement or rotation of the plurality of axes of the antenna; and a controller for controlling the information sensed by the motion sensor and a strength of a signal of the antenna having the plurality of axes received in real time.

The motion sensor may include an acceleration sensor, a gyro sensor or a geomagnetic sensor.

The strength of the signal of the antenna having different axes may be measured using the information sensed by the motion sensor and strengths of signals of the antenna generated at first and second positions.

The controller may compare a strength of a signal of a first-axis antenna at the first position and a strength of a signal of a second-axis antenna at the first position, a strength of a signal of the first-axis antenna at the second position and a strength of a signal of the second-axis antenna at the second position, and the information sensed by the motion sensor due to a movement or rotation from the first position to the second position with preset threshold values to decide whether or not a user approaches a vehicle.

The antenna may include an antenna having a single axis.

According to another exemplary embodiment of the present disclosure, a method for operating an antenna system using a motion sensor includes: measuring a strength of a signal of a first-axis antenna at a first position and a strength of a signal of a second-axis antenna at the first position; measuring a strength of a signal of the first-axis antenna at a second position and a strength of a signal of the second-axis antenna at the second position; measuring information sensed by the motion sensor depending on a movement from the first position to the second position; and comparing the information sensed by the motion sensor with strengths of signals of the first-axis antenna and the second-axis antenna received in real time and measured at the first and second positions.

A strength of a signal of an antenna having different axes may be measured using the information sensed by the motion sensor and the strengths of the signals of the antenna generated at the first and second positions.

The strength of the signal of the first-axis antenna at the first position and the strength of the signal of the second-axis antenna at the first position, the strength of the signal of the first-axis antenna at the second position and the strength of the signal of the second-axis antenna at the second position, and the information sensed by the motion sensor due to a movement or rotation from the first position to the second position may be compared with preset threshold values to decide whether or not a user approaches a vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Advantages and features of the present disclosure and methods accomplishing them will become apparent from exemplary embodiments described below in detail with reference to the accompanying drawings. However, the present disclosure is not limited to exemplary embodiments described herein, but may be implemented in other forms. These exemplary embodiments are provided in order to describe the present disclosure in detail so that those skilled in the art to which the present disclosure pertains may easily practice the spirit of the present disclosure.

In the accompanying drawings, exemplary embodiments of the present disclosure are not limited to illustrated specific forms, which may be exaggerated for the purpose of clarity. Although specific terms have been used in the present disclosure, they are used in order to describe the present disclosure and are not used in order to limit the meaning or the scope of the present disclosure, which is disclosed in the claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary embodiment of the present disclosure will be described in detail with reference to the accompanying drawings.

Figure 1:
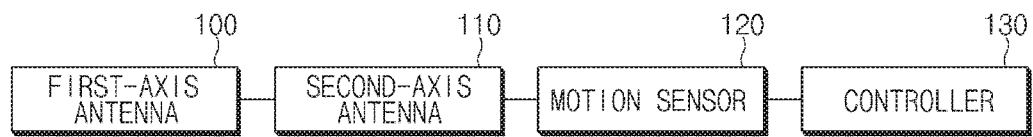
FIG. 1 is a block view for describing an antenna system using a motion sensor according to an exemplary embodiment of the present disclosure.

FIG. 1 is a block view for describing an antenna system using a motion sensor according to an exemplary embodiment of the present disclosure.

Referring to FIG. 1, the antenna system using a motion sensor may have a structure in which a motion sensor 120 and a controller 130 are included in a first-axis antenna 100 or a second-axis antenna 110 or a structure in which a motion sensor 120 and a controller 130 are included in an antenna including both of a first-axis antenna 100 and a second-axis antenna 110.

Here, the first-axis antenna 100 may be referred to as an X-axis antenna, the second-axis antenna 110 may be referred to as a Y-axis antenna, the third-axis antenna (not illustrated) may be referred to as a Z-axis antenna and the structure in which the motion sensor 120 is included in the antenna including both of the first-axis antenna 100 and the second-axis antenna 110 has been described by way of example. However, even in the case in which only the first-axis antenna 100 or the second-axis antenna 110 is provided, the antenna system using a motion sensor 120 may be designed, and the first-axis antenna 100 or the second-axis antenna 110 may be designed with a size larger than that of an existing antenna, and the antenna system using a motion sensor may be designed using a single antenna.

In addition, the motion sensor 120 may include an acceleration sensor, a gyro sensor, a geomagnetic sensor or the like.

That is, the antenna system using a motion sensor corrects changed axis information in the first-axis antenna 100 or the second-axis antenna 110 generated by movement or rotation of the respective antennae and a strength of a signal received in real time in the first-axis antenna 100 or the second-axis antenna 110. Thus, it is possible to obtain the same information on the antenna as a structure in which all of the first-axis antenna 100, the second-axis antenna 110 and the third-axis antenna (not illustrated) are provided in the related art.

In addition, the antenna system using a motion sensor may correct the motion sensor 120 using a movement or rotation of a smart device wearable by a user, and may correct changed information (changed information of an axis or motion sensor information) in the first-axis antenna 100 or the second-axis antenna 110 and a strength of a signal of the first-axis antenna 100 or the second-axis antenna 110 in real time using an axis calculation algorithm.

Here, the smart device wearable by the user may be a watch type or a band type or another type, and since the axis calculation algorithm is a technology that may be generally used by those skilled in the art, a detailed description thereof will be omitted.

In addition, when the user wearing the smart device including the first-axis antenna 100 or the second-axis antenna 110 and the motion sensor 120 moves from a first position to a second position, the antenna system using a motion sensor may sense a strength of a signal of an antenna at the first position and a strength of a signal of an antenna at the second position.

The controller 130 may compare the changed information (the information measured by the motion sensor) in the first-axis antenna 100 or the second-axis antenna 110 generated by the movement from the first position to the second position and the strengths of the signals of the antennae at the respective positions generated by the movement from the first position to the second position with each other to sense signals and decide distances in all directions, similar to a multi-axis antenna including all of the first-axis antenna to third-axis antenna.

Here, a smart device to which the related art is applied obtains a plurality of antenna information at one point so as to obtain the plurality of antenna information, while a smart device to which the present technology is applied obtains a plurality of antenna information using strengths of signals of the antennae measured at a plurality of points and information measured in the motion sensor.

Figure 2:
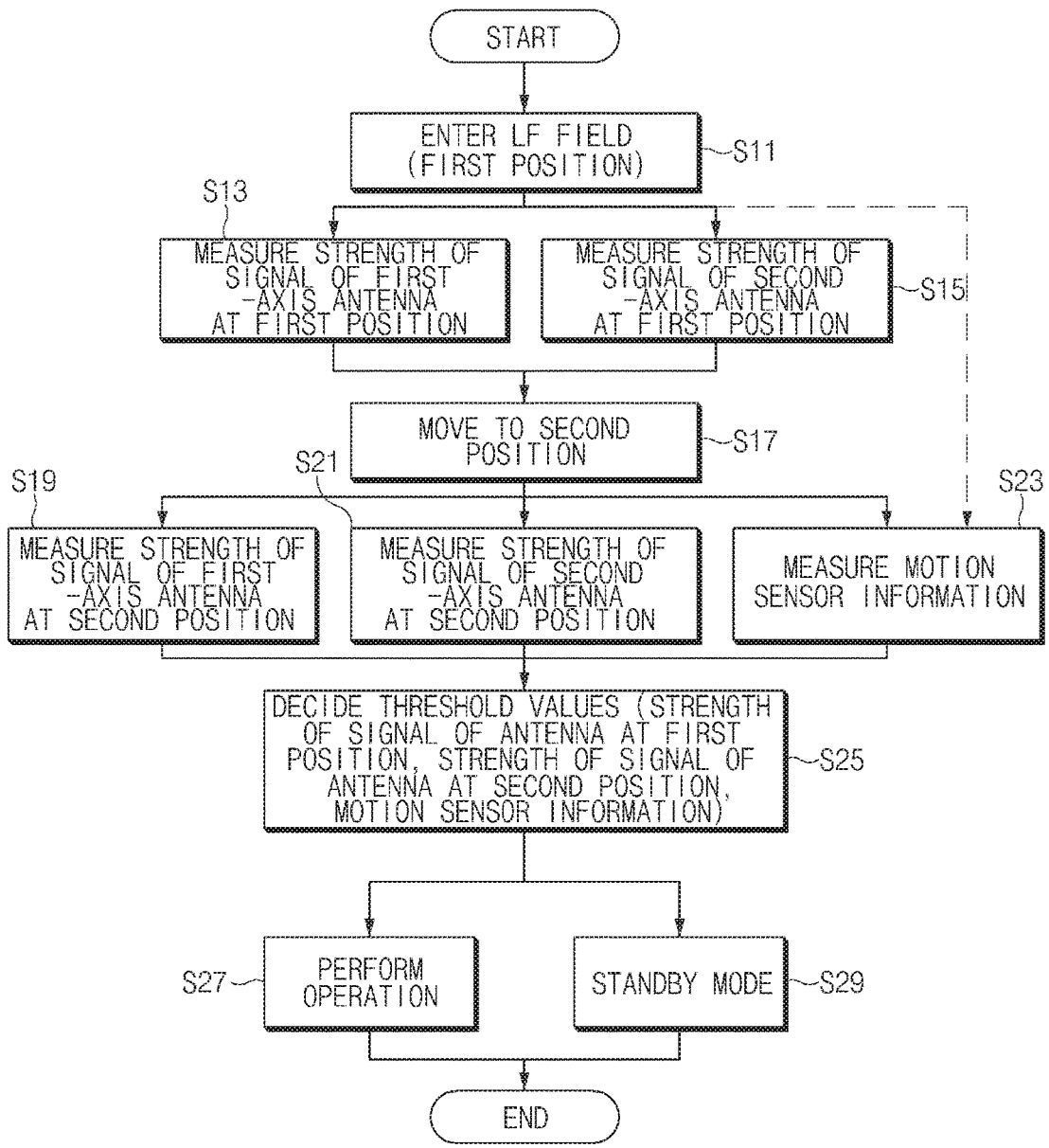
FIG. 2 is a flowchart for describing a method for operating an antenna using a motion sensor according to an exemplary embodiment of the present disclosure.

FIG. 2 is a flowchart for describing a method for operating an antenna using a motion sensor according to an exemplary embodiment of the present disclosure.

Here, the first-axis antenna may be referred to as an X-axis antenna, the second-axis antenna may be referred to as a Y-axis antenna and the case in which both of the first-axis antenna and the second-axis antenna are provided will be described by way of example in the present disclosure.

Referring to FIG. 2, when a user wearing a smart device including a single antenna or a plurality of antennae and a motion sensor moves to a first position (that is, when the user enters a low frequency field), the antenna system using a motion sensor measures a strength of a signal of a first-axis antenna at the first position and a strength of a signal of a second-axis antenna at the first position (S11 to S15).

Next, when the user wearing the smart device including the motion sensor moves from the first position to a second position, the antenna system using a motion sensor measures a strength of a signal of the first-axis antenna at the second position and a strength of a signal of the second-axis antenna at the second position, and further measures motion sensor information depending on movement from the first position to the second position (S17 to S23).

That is, the antenna system using a motion sensor may obtain the motion sensor information by the movement of the user wearing the smart device including the motion sensor or a fine wave, or other motion, of a wrist of the user.

For example, the antenna system using a motion sensor may correct changed information in the first-axis antenna or the second-axis antenna (changed information of an axis or the motion sensor information) and a strength of a signal in the first-axis antenna (or the second-axis antenna) in real time using an axis calculation algorithm.

Next, the antenna system using a motion sensor may compare the strength of the signal of the first-axis antenna at the first position and the strength of the signal of the second-axis antenna at the first position, the strength of the signal of the first-axis antenna at the second position and the strength of the signal of the second-axis antenna at the second position, and the motion sensor information corresponding to the movement from the first position to the second position (the motion sensor information at the first position and the motion sensor information at the second position) that are measured by the antenna system using a motion sensor with preset threshold values to sense signals and decide distances in all directions depending on strengths of signals of antennae for each axis on the basis of collected information (S25).

That is, the antenna system using a motion sensor performs an operation of sensing signals and deciding distances in all directions (S27) when the strength of the signal of the first-axis antenna at the first position and the strength of the signal of the second-axis antenna at the first position, the strength of the signal of the first-axis antenna at the second position and the strength of the signal of the second-axis antenna at the second position, and the motion sensor information corresponding to the movement from the first position to the second position that are measured by the antenna system using a motion sensor are larger than the preset threshold values. Further, the antenna system using a motion sensor enters a standby mode (S29) when the strength of the signal of the first-axis antenna at the first position and the strength of the signal of the second-axis antenna at the first position, the strength of the signal of the first-axis antenna at the second position and the strength of the signal of the second-axis antenna at the second position, and the motion sensor information corresponding to the movement from the first position to the second position that are measured by the antenna system using a motion sensor are smaller than the preset threshold values.

For example, a process in which the antenna system using a motion sensor performs the operation of sensing signals and deciding distances in all directions means a process in which the antenna system using a motion sensor recognizes whether or not a user or a driver approaches a vehicle and performs an operation of transmitting a signal to the vehicle depending on the recognized signal, and a process in which the antenna system using a motion sensor enters the standby mode means an operation process in which the antenna system using a motion sensor does not recognize whether or not the user or the driver approaches the vehicle and does not transmit the signal to the vehicle.

Figure 3A:
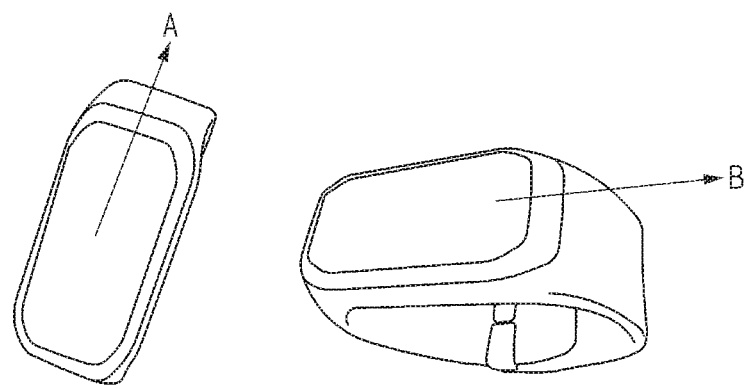
FIGS. 3A to 3C are views for describing a process of moving an axis of an antenna through an operation of a motion sensor according to an exemplary embodiment of the present disclosure in detail.
Figure 3B:
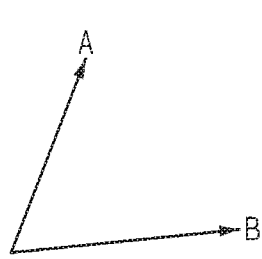
Figure 3C:
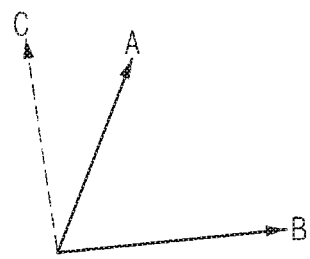

FIGS. 3A to 3C are views for describing a process of moving an axis of an antenna using a motion sensor according to an exemplary embodiment of the present disclosure in detail. Here, a process of changing a position of a first-axis antenna to a first position and a second position will be described.

Referring to FIGS. 3A to 3C, when positions of the first axis-antenna are compared with each other in a process of changing a position of the first-axis antenna from a first position A of the first-axis antenna to a second position B of the first-axis antenna, it may be appreciated that axis of the first-axis antenna is moved or rotated while the smart device is being moved or rotated from the first position to the second position.

That is, the antenna system using a motion sensor may extract strength information of a signal (a signal C of the second-axis antenna at a corrected position) of a plurality of antennae using a strength of a signal (a signal A of the first-axis antenna at the first position) of the antenna measured at the first position, a signal (a signal B of the first-axis antenna at the second position) of the antenna measured at a position moved from the first position, and rotation information of an axis of the antenna provided from the motion sensor.

In detail, the antenna system using a motion sensor may extract all antenna information from the first-axis antenna to the third-axis antenna by only first-axis antenna information when the user wearing the smart device including the antennae and the motion sensor performs a more complex movement such as a wave of a his/her arm in forward and rearward directions, a wave of a wrist, or the like, such that the wrist has a three-dimensional rotation motion or movement rather than a two-dimensional rotation motion or movement.

As described above, a present technology is a technology capable of decreasing a size of the smart device by decreasing a wasted space of the smart device by using the motion sensor together with the smart device including the first-axis antenna or the second-axis antenna.

In addition, the present technology is a technology capable of decreasing a cost required for manufacturing the smart device by decreasing the number of expensive antennae provided in the smart device and replacing the expensive antennae by a cheaper motion sensor.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An antenna system using a motion sensor, comprising:
an antenna having a first axis and a second axis within a smart device, wherein the motion sensor senses a change in axis information which is generated by movement or rotation of the first axis and the second axis of the antenna from a first position to a second position; and
a controller for controlling the changed axis information sensed by the motion sensor and a strength of a signal of the antenna having the first axis and the second axis received in real time,
wherein the controller extracts a strength of the signal of the antenna having a third axis using the changed axis information sensed by the motion sensor and strengths of signals of the antenna having the first axis generated at the first and second positions and having the second axis generated at the first and second positions, and
wherein the controller compares the strength of the signal of the antenna having the first axis at the first position, the strength of the signal of the antenna having the second axis at the first position, the strength of the signal of the antenna having the first axis at the second position, the strength of the signal of the antenna having the second axis at the second position, and the changed axis information sensed by the motion sensor due to movement or rotation from the first position to the second position, with threshold values, respectively, to decide whether or not a user approaches a vehicle.

2. The antenna system of claim 1, wherein the motion sensor includes an acceleration sensor, a gyro sensor or a geomagnetic sensor.

3. A method for operating an antenna system using a motion sensor, comprising:

measuring a strength of a signal of a first-axis antenna at a first position and a strength of a signal of a second-axis antenna at the first position;

measuring a strength of a signal of the first-axis antenna at a second position and a strength of a signal of the second-axis antenna at the second position;

measuring a change in axis information sensed by the motion sensor depending on a movement from the first position to the second position;

comparing the changed axis information sensed by the motion sensor with the strengths of signals of the first-axis antenna and the second-axis antenna received in real time and measured at the first and second positions; and extracting a strength of a signal of a third-axis antenna using the changed axis information sensed by the motion sensor and the strengths of the signals of the first-axis antenna generated at the first and second positions and the second-axis antenna generated at the first and second positions, wherein the controller compares the strength of the signal of the antenna having the first axis at the first position, the strength of the signal of the antenna having the second axis at the first position, the strength of the signal of the antenna having the first axis at the second position, the strength of the signal of the antenna having the second axis at the second position, and the changed axis information sensed by the motion sensor due to movement or rotation from the first position to the second position, with threshold values, respectively, to decide whether or not a user approaches a vehicle.

* * * * *